United States Patent
Furlong

(10) Patent No.: US 8,967,416 B2
(45) Date of Patent: Mar. 3, 2015

(54) FOOD STORAGE CONTAINER AND CONTAINER SYSTEM

(75) Inventor: Brian Douglas Furlong, Davidson, NC (US)

(73) Assignee: Rubbermaid Incorporated, Huntersville, NC (US)

( * ) Notice: Subject to any disclaimer, the term of this patent is extended or adjusted under 35 U.S.C. 154(b) by 930 days.

(21) Appl. No.: 12/351,574

(22) Filed: Jan. 9, 2009

(65) Prior Publication Data

US 2010/0176022 A1   Jul. 15, 2010

(51) Int. Cl.
- *B65D 43/03* (2006.01)
- *B65D 21/02* (2006.01)
- *A47J 47/10* (2006.01)

(52) U.S. Cl.
CPC .............. *B65D 21/0222* (2013.01); *A47J 47/10* (2013.01)
USPC .......................... 220/380; 220/367.1; 206/508

(58) Field of Classification Search
USPC ............... 206/508, 565; 220/367.1, 380, 511, 220/529, 556; 62/459; 99/448, 449, 450
See application file for complete search history.

(56) References Cited

U.S. PATENT DOCUMENTS

| | | | |
|---|---|---|---|
| 2,241,064 A | 5/1941 | Harbison | |
| 2,412,325 A | 12/1946 | Devine et al. | |
| 2,682,970 A | 7/1954 | Brothers, Jr. | |
| 3,137,409 A | 6/1964 | Davis | |
| 3,722,731 A | 3/1973 | McCormick et al. | |
| 3,730,385 A | 5/1973 | Rost | |
| 3,784,052 A | 1/1974 | Edwards | |
| 3,985,990 A * | 10/1976 | Levinson | 219/729 |
| 3,989,142 A | 11/1976 | Gwilliam, Jr. et al. | |
| 4,058,214 A | 11/1977 | Mancuso | |
| 4,082,184 A | 4/1978 | Hammer | |
| 4,127,189 A | 11/1978 | Shumrak et al. | |
| 4,183,446 A | 1/1980 | Davis | |
| 4,204,609 A | 5/1980 | Kuhn | |
| 4,407,426 A | 10/1983 | McLaren et al. | |
| 4,412,629 A | 11/1983 | Dart et al. | |
| 4,412,630 A | 11/1983 | Daenen | |
| 4,446,969 A | 5/1984 | Tyler | |
| D277,632 S | 2/1985 | Staufenberg | |
| 4,512,497 A | 4/1985 | Grusin | |
| 4,576,309 A | 3/1986 | Tzifkansky et al. | |

(Continued)

FOREIGN PATENT DOCUMENTS

WO   WO 03/062070   7/2003

OTHER PUBLICATIONS

Product literature for Trouve food storage containers from www.savethelids.com; admitted prior art, May 3, 2007.

(Continued)

*Primary Examiner* — Jeffrey Allen
(74) *Attorney, Agent, or Firm* — Lempia Summerfield Katz LLC

(57) ABSTRACT

A food storage container has a base with a bottom, a continuous side wall extending up from the bottom and terminating at an upper end, a storage space within the side wall above the bottom, and an open top. A lid of the container is configured to attach to and close off the open top. A tray of the container has a perforate panel and a tray foot. The tray can fit within the storage space with the tray foot resting on the bottom of the base and the perforate panel elevated above the bottom of the base. A connecting structure is carried in part on the lid, in part on the base, and in part on the tray and is configured so that the lid and the tray can be connected to one another and to the bottom under the base.

16 Claims, 7 Drawing Sheets

(56) References Cited

U.S. PATENT DOCUMENTS

| | | | |
|---|---|---|---|
| 4,600,117 A | 7/1986 | Tzifkansky et al. | |
| 4,685,582 A | 8/1987 | Pulciani et al. | |
| 4,700,842 A | 10/1987 | Grusin | |
| 4,759,478 A | 7/1988 | Richardson et al. | |
| 4,770,318 A | 9/1988 | Earl | |
| 4,804,092 A | 2/1989 | Jones | |
| 4,951,832 A * | 8/1990 | Tenney et al. | 220/23.83 |
| 4,953,743 A | 9/1990 | Dart et al. | |
| 5,065,889 A | 11/1991 | Conti | |
| 5,184,745 A | 2/1993 | Havens et al. | |
| 5,220,999 A | 6/1993 | Goulette | |
| 5,312,011 A | 5/1994 | Fischer | |
| 5,363,978 A | 11/1994 | Molo | |
| D355,814 S | 2/1995 | Van Valkenburg et al. | |
| 5,409,126 A | 4/1995 | DeMars | |
| 5,409,128 A | 4/1995 | Mitchell | |
| D359,905 S | 7/1995 | Molo | |
| D363,223 S | 10/1995 | Molo | |
| 5,586,656 A | 12/1996 | Abrums | |
| D386,685 S | 11/1997 | Miller | |
| 5,692,617 A | 12/1997 | Adams | |
| D389,012 S | 1/1998 | Miller | |
| 5,762,228 A | 6/1998 | Morgan et al. | |
| 5,769,229 A | 6/1998 | Andress et al. | |
| 5,775,483 A | 7/1998 | Lown et al. | |
| 5,799,792 A | 9/1998 | Abrums | |
| 5,931,333 A * | 8/1999 | Woodnorth et al. | 220/573.4 |
| 5,992,679 A | 11/1999 | Porchia et al. | |
| D419,829 S | 2/2000 | Wilson et al. | |
| 6,021,903 A * | 2/2000 | Hanson | 206/541 |
| 6,029,843 A | 2/2000 | Kroscher et al. | |
| D423,283 S | 4/2000 | Laib | |
| 6,105,810 A | 8/2000 | Daenen et al. | |
| 6,367,651 B2 | 4/2002 | Laib et al. | |
| D466,364 S | 12/2002 | Demore | |
| D475,620 S | 6/2003 | Chen et al. | |
| 6,571,981 B2 | 6/2003 | Rohlfs | |
| 6,685,049 B1 | 2/2004 | Paladino | |
| 6,708,824 B2 | 3/2004 | Sahm, III | |
| 6,729,472 B2 | 5/2004 | Stucke et al. | |
| 6,796,430 B2 | 9/2004 | Mercier et al. | |
| D502,060 S | 2/2005 | Dais et al. | |
| D502,061 S | 2/2005 | Dais et al. | |
| 6,868,980 B2 | 3/2005 | Schultz et al. | |
| 6,886,694 B2 | 5/2005 | McNeeley et al. | |
| D507,155 S | 7/2005 | Gosen et al. | |
| 2003/0116572 A1 | 6/2003 | Klock et al. | |
| 2004/0035867 A1 * | 2/2004 | Schultz et al. | 220/212 |
| 2005/0000966 A1 | 1/2005 | Nordland et al. | |
| 2005/0051549 A1 * | 3/2005 | Nelson | 220/23.83 |
| 2005/0109654 A1 | 5/2005 | Kolar et al. | |
| 2006/0261065 A1 | 11/2006 | Claypool et al. | |

OTHER PUBLICATIONS

Product literature for Sanp saver food storage containers from www.snap-saver.com; admitted prior art, May 3, 2007.

* cited by examiner

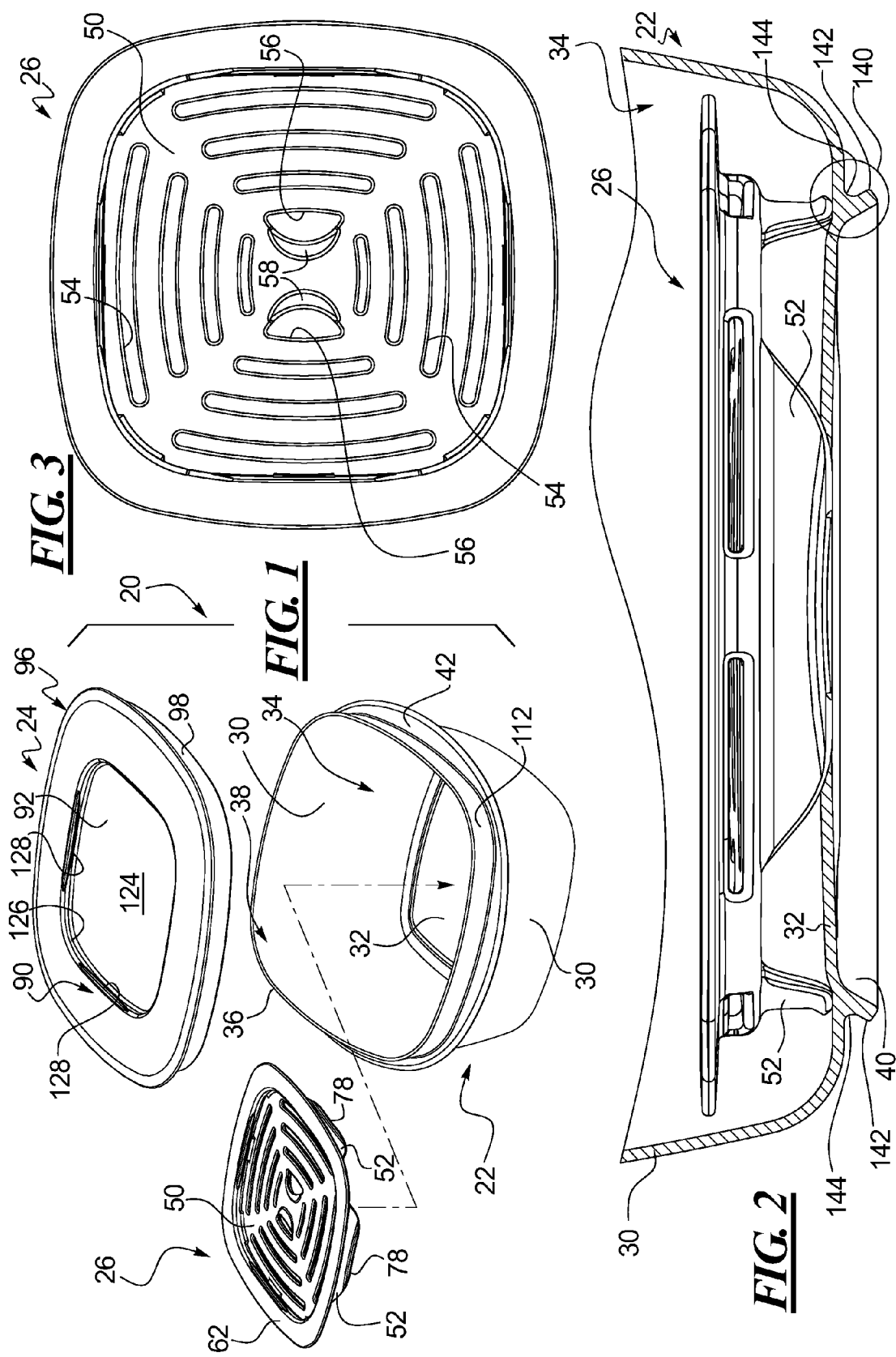

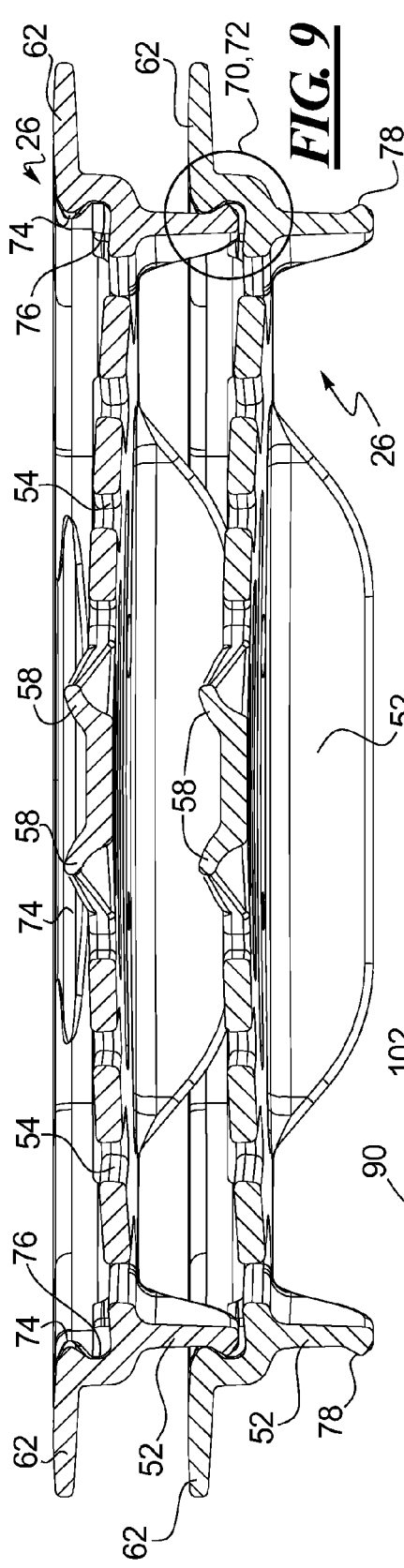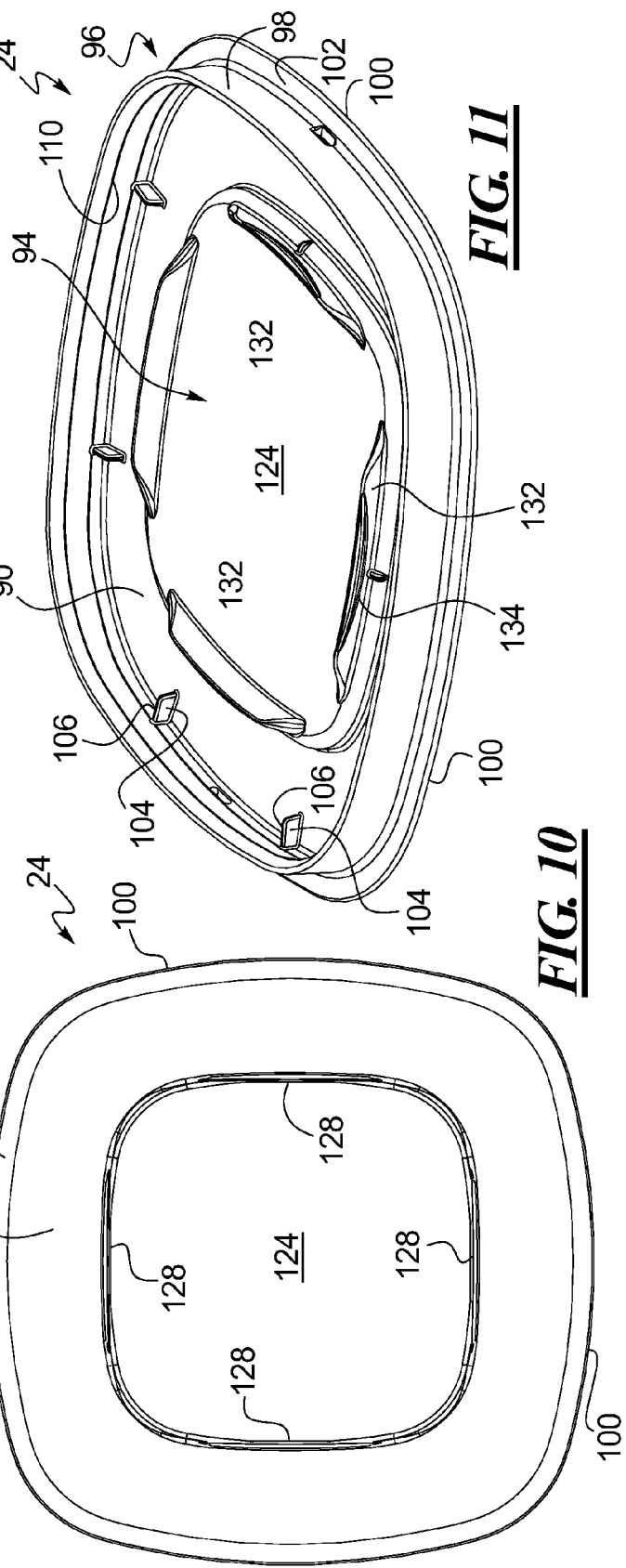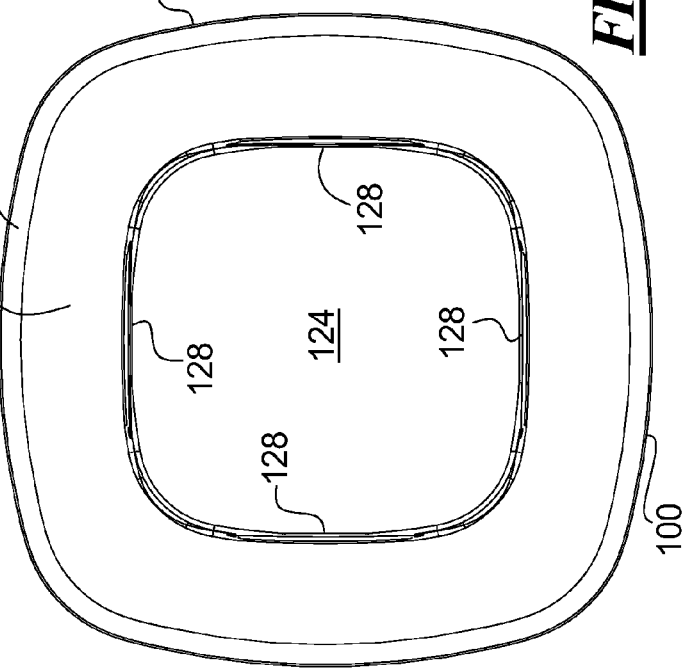

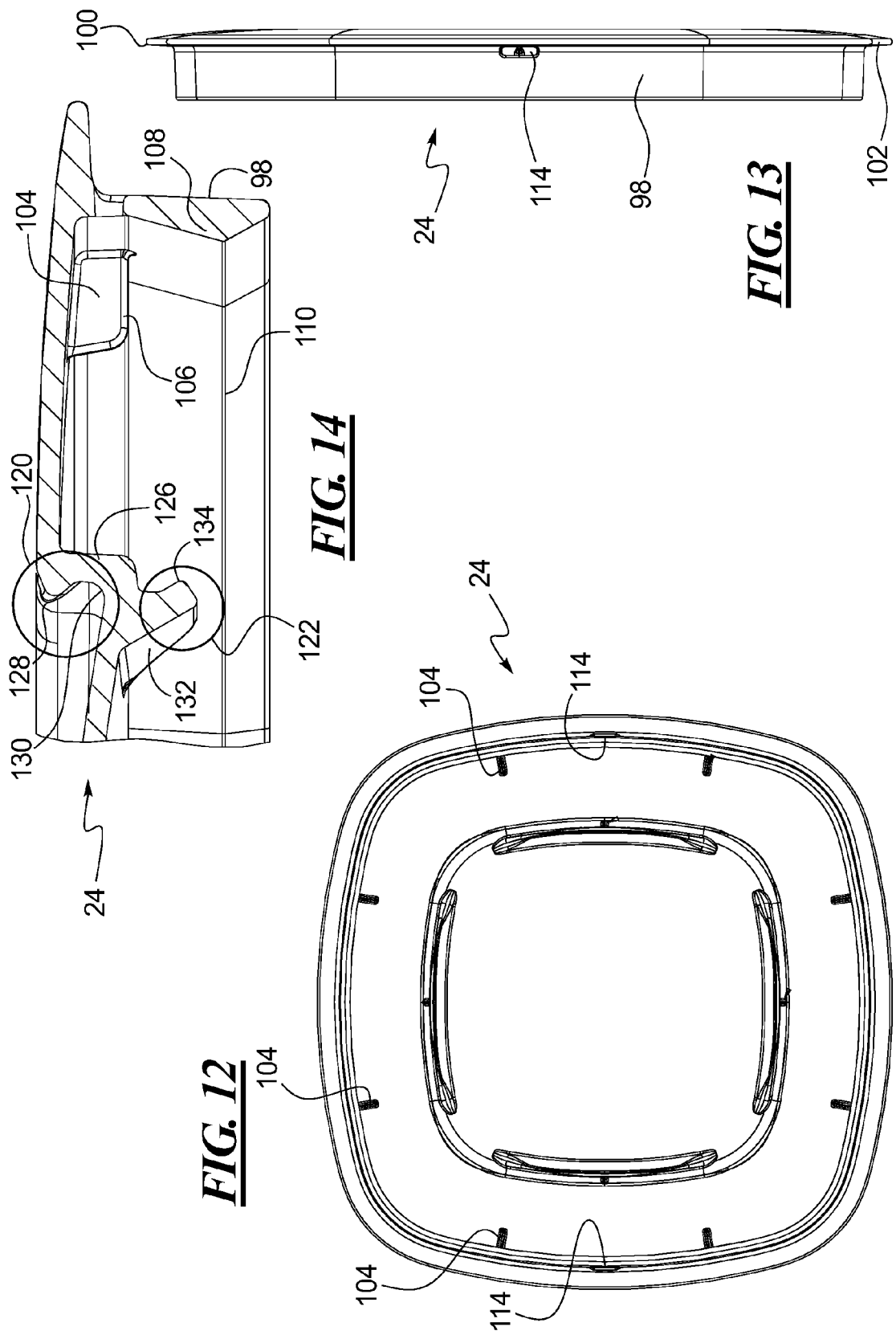

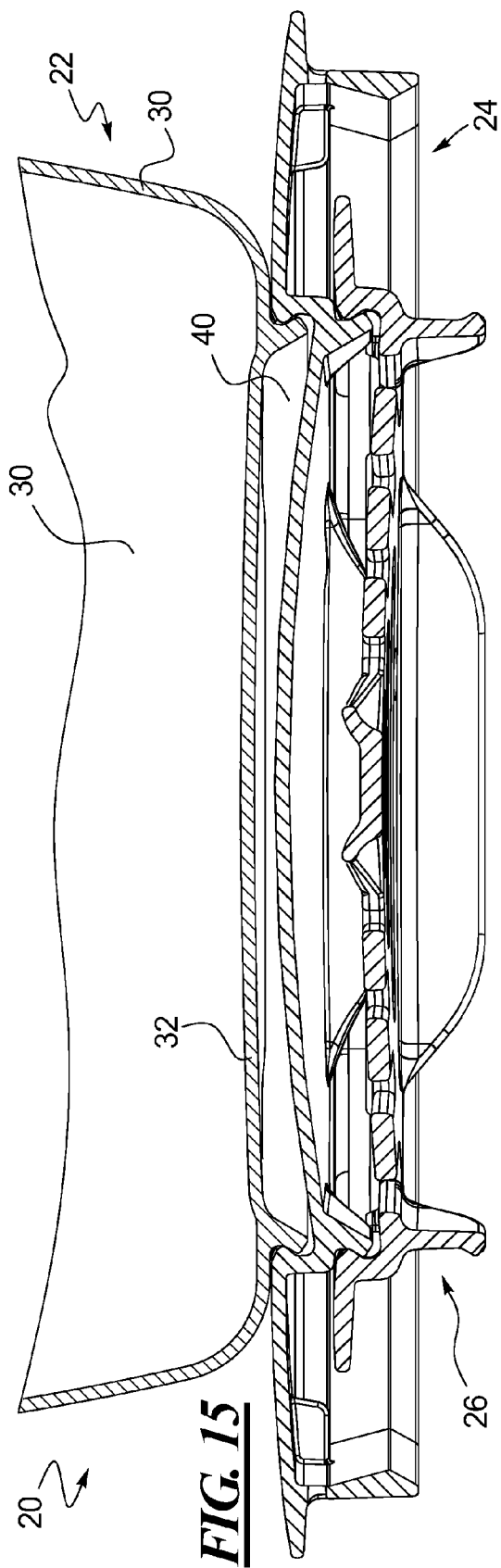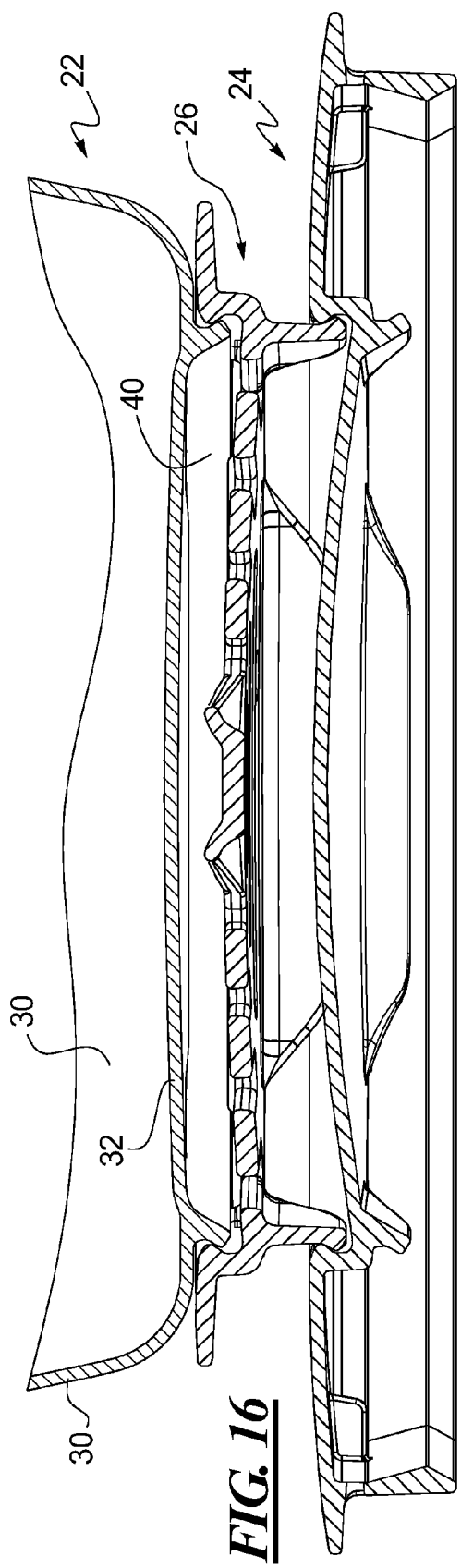

FOOD STORAGE CONTAINER AND CONTAINER SYSTEM

BACKGROUND OF THE INVENTION

1. Field of the Disclosure

The present disclosure is generally directed to food storage containers, and more particularly to a storage container that includes a container base, a vented lid, and a perforate produce tray and a container system having a plurality of the containers with connecting structures configured to connect the lids, trays, and bases together for organized storage.

2. Description of Related Art

It is known in the art of food storage containers that produce lasts longer when stored in containers that are not completely sealed but instead vented to the surrounding atmosphere. Produced needs to breathe and, thus, providing air flow to produce inside of a container extends the period before microorganisms can grow. This can keep the produce fresher for a longer period of time. There are products available today that attempt to address this issue. For example, U.S. Pat. No. 6,367,651 to Dart Industries discloses a storage container with a pair of vents and plugs. The plugs can be opened or closed together or separately to allow the container to vent to atmosphere and to allow a user to control the amount of air flow. A bottom of the storage container is also provided with bumps to create and troughs beneath produce stored in the container.

Vented lids for storage containers are also known in the art. Most of these types of lids are provided for use during microwave usage. The vent is typically provided in the top panel of the lid for allowing steam to escape the container. Providing the vent in the top of the lid may allow spilled food or liquid items to enter the storage container unintentionally, even with the lid on the container. Often times, storage containers are used to store food items within a refrigerator employing wire shelving. Other times, such storage containers are stacked one on the other during use. In either situation, the likelihood of spillage entering the vent on top of one of the containers is relatively high.

Although produce storage containers attempt to address longevity and freshness concerns, these types of storage containers typically are not provided with efficient organizational characteristics for storing one or more of the containers and lids when not being used. However, storage and organization of non-produce and other such containers is an issue that others in the art have also attempted to address. Conventional food storage containers are commonly comprised of generally or substantially rigid or flexible, resilient plastic components. Plastic containers of this type generally have a base and a lid that attaches to the top of the base to seal the container. The base typically has a bottom and a side wall that together define an interior storage space in the container. The lid can be attached to the base to cover the open top and to seal the storage space.

Each container typically includes a corresponding lid sized to fit its associated container. A user will often store empty containers in a kitchen cabinet or pantry area when not in use. When not being used, the lids can easily become separated from their associated container bases. Users have expressed frustration over lost or misplaced lids and the difficulty in finding the correct lid for a selected container.

Some known container systems include lids that attach to the bottom of their respective container bases to help manage the containers and lids by keeping the lids and their corresponding containers together. Such lids, when attached to the base bottoms, often hinder space efficient stacking and storage of multiple containers.

During normal use, a container base is also typically filled with food items and covered with the lid. Users sometimes stack full containers for refrigerator storage or for transport to a location outside the home. However, the stacked containers tend to be unstable and can slide off of each other and spill. This makes it difficult to keep the containers organized in refrigerated storage and difficult to transport. A known storage container system disclosed in U.S. Pat. No. 6,886,694, commonly assigned to the assignee of the present patent, employs a lid and base configuration whereby a base can rest on the lid of another container and register with the lid. However, the lid of the underlying base does not connect or attach to the base of the overlying container.

Another example of a prior art container system is shown and described in U.S. Pat. No. 5,692,617 and includes a plurality of containers and a plurality of lids that can attach to one another in a variety of ways. Each lid includes opposed male and female fasteners centrally located with one fastener on each side of the lid. The lids are connectable as a stack by interconnecting adjacent male and female fasteners of adjacent lids. Additionally, a stack of lids can be attached to a stack of nested containers. Each container includes a female fastener, identical to the female fastener on the lids, located on its bottom surface. The stacked lids can be attached to the nested containers by snapping an exposed one of the aforementioned male lid fasteners to an exposed female fastener of the bottom of an exposed container. When full and in use, these containers could be stacked upon one another, but the stack would not be stable because of the small size and configuration of the male and female connectors on the bases and lids.

Still another prior art container system is shown and described in U.S. Pat. No. 4,951,832 and includes a plurality of containers and lids. The inner surface of each lid is contoured either to snap-fit over the open top or onto the bottom of its respective container. The different sized containers can be stacked in a nested configuration, one inside the other, while the lids remain attached to the bottom of the corresponding container. The lids can not be stacked together and the containers when full and in use can not be stacked on top of one another in a stable arrangement.

Yet another prior art container system is shown and described in U.S. Pat. No. 5,409,128 and includes stackable containers with lids. The containers have a first threaded segment on an outer surface near the open top adapted to engage with a first threaded segment on an inner surface of the lids so that the lids close off the open top of the container. Additionally, each lid includes a stepped portion of its top. The stepped portion includes a second threaded segment sized and shaped to mate with a second threaded segment formed within a lower rim of the container so that the lids can thread to the bottom of adjacent containers when stacked. A stable stack can be created, but the lids can not attach to one another for storage and the threaded connection method can be somewhat difficult to use, particularly with full containers.

BRIEF DESCRIPTION OF THE DRAWINGS

Objects, features, and advantages of the present invention will become apparent upon reading the following description in conjunction with the drawing figures, in which:

FIG. 1 shows an exploded perspective view of one example of a storage container constructed in accordance with the teachings of the present invention.

FIG. 2 shows a partial cross section through a portion of the base of the container in FIG. 1 to illustrate the produce tray inserted in the base.

FIG. 3 shows a top plan view of the produce tray of the container in FIG. 1.

FIG. 9 shows a cross-section similar to that in FIG. 7 of two like produce trays stacked and connected to one another.

FIG. 10 shows a top plan view of the lid of the container in FIG. 1.

FIG. 11 shows a bottom perspective view of the lid in FIG. 10.

FIG. 12 shows a bottom plan view of the lid in FIG. 10.

FIG. 13 shows a side view of the lid in FIG. 10.

FIG. 14 shows a cross-section through a portion of the lid in FIG. 10 and taken along line XIV-XIV.

FIG. 15 shows a cross-section similar to that in FIG. 14 of the lid in FIGS. 1 and 10 connected to the bottom of the base and with the tray in FIGS. 1 and 3 connected to the bottom of the lid.

FIG. 16 shows a cross-section similar to that in FIG. 15 but with the tray in FIGS. 1 and 3 connected to the bottom of the base and with the lid in FIGS. 1 and 10 connected to the bottom of the tray.

DETAILED DESCRIPTION OF THE DISCLOSURE

Figure 5:
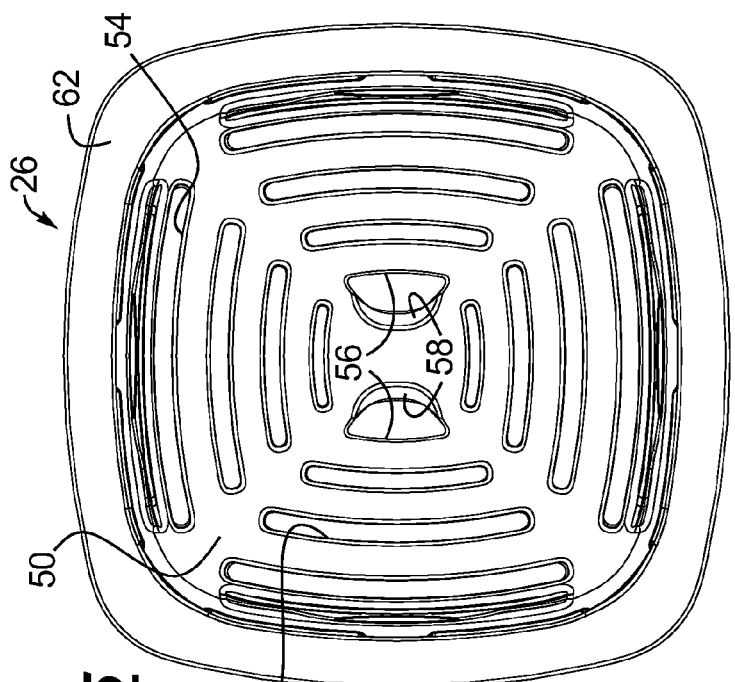
FIG. 5 shows a bottom plan view of the produce tray in FIG. 3.
Figure 4:
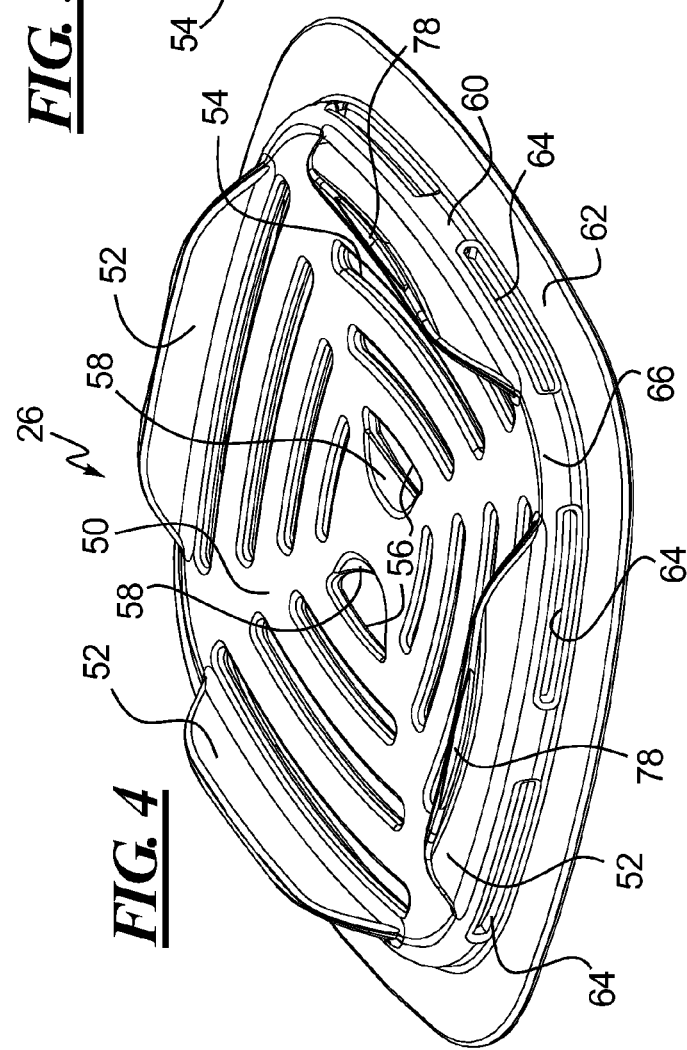
FIG. 4 shows a bottom perspective view of the produce tray of the container in FIG. 3.

The present invention is for a storage container and a container system. The disclosed container and system solves or improves upon the above-noted and/or other problems with and disadvantages of currently known storage containers. The disclosed container has a base, a produce tray, and a lid. The lid, base, and tray have connecting structures for interconnecting the various parts together in different arrangements for organization and storage. The disclosed system employs a plurality of the containers whereby the lids and trays can be stacked and connected in different, optional configurations and can also be optionally connected to one another or to the bases. The disclosed produce trays have a perforate panel that is raised above the base bottom when inserted in the base. The disclosed lids have vents in the side wall of the lid skirt under an overhang or lip. The disclosed trays allow for air to circulate around and under produce stored in the container. The trays also elevate produce above the base bottom and thus above any moisture collected in the base during use. The location of the disclosed vents significantly inhibits unintentional spillage of food particles or liquids through the vents into the lid during use. The disclosed lids and bases can also be connected to one another during use in a stable stacked configuration, allowing for carrying and transporting multiple containers.

The lids, trays, and bases of the disclosed system include connecting structures that allow for a variety of connections between the parts. The lids and bases include connecting components that allow a lid to be connected to the bottom of a base. The lids also include connecting components that cooperate with a corresponding component on the trays to allow a lid to be connected to a tray. The trays also include connecting components that allow the trays to be connected to the bottom of a base, to one another, or to either side of the lids. Thus, the lids, trays, and container bases disclosed herein can be connected to one another in a variety of configurations. Multiple lids and trays can be connected together in a stack to keep the lids and trays together when not in use. The stack can be connected to the bottom of a base or to the open top of a base for use. In another example, a single lid and a tray may be connected to one another and to the bottom of an associated container base to keep the lid, tray, and base together. In still another example, a base sealed with a lid can be stacked onto and connected to a lid on another base and the trays can reside in the respective bases for use.

Currently known plastic storage containers are typically stored in a kitchen cabinet or pantry area when not in use. However, many homes are not equipped with adequate storage space, especially for kitchen and food related storage items. Most users have a variety of container sizes with associated lids that are sized and shaped to fit a particular container to seal the container when in use. Currently known plastic storage containers typically take up a large amount of cabinet storage space since the container bases and lids are fairly rigid. A typical user may store the container bases and lids separately in the cabinet or pantry. Users often complain that the containers and lids become separated in the cabinet or pantry, requiring time and effort to find the lid that matches the desired container. This problem is exacerbated by adding produce trays for the containers to the mix. Even when a base and lid organizer or rack is employed, it can still be difficult for a user to find a desired base and the appropriate lid for that base. Some users store their containers in a lid-on condition so that the containers may be stacked and the lids readily located. However, many cabinets and pantries are not tall enough to allow more than two such assembled containers to be stacked, requiring the stacked containers to be stored in a side-by-side condition. This method takes up a lot of precious shelf space in the cabinet or pantry and leaves significant cabinet or pantry storage space unused.

During use, plastic food storage containers hold food items and either are stored in a refrigerator or are transported to venues outside the home, such as, for example, to picnics, parties, pot luck dinners, or church socials. Users often employ more than one container to store or transport different food items and may stack the various containers. Stacking the full containers in a refrigerator, for example, provides organized storage. However, the stacked containers may slide around, slide off of one another, tip and fall, or otherwise become separated from each other. This can create spills or a cluttered and unorganized refrigerator. Additionally, when in use, users typically stack and carry full containers during transport. However, the full containers can easily slip off of one another, tip and fall, and become separated. This makes it difficult to carry and load the full containers from the home into a vehicle and to carry the containers from the vehicle to the destination. Additionally, it can be difficult to prevent the containers from becoming separated and sliding around inside the vehicle during transport. This not only can make transporting the full containers difficult but also can create the possibility of food spillage.

The present invention overcomes these and other problems with prior known containers by providing a storage container system that includes one or more container bases, produce trays, and associated lids that can be arranged and connected in a variety of ways during use and for storage when not in use. The connecting structures of the disclosed containers are configured so that the container bases, trays, and lids can be stacked to form a small footprint and take up as little space as possible either in use while storing food items in a refrigerator or in non-use while being stored in a cabinet or pantry. Additionally, the connecting structures allow the container bases and lids to be stacked together in a locked, stable, or secure manner to prevent separation to facilitate storage or transport during use.

Turning now to the drawings, FIG. 1 shows one example of a container assembly or container 20 constructed in accordance with the teachings of the present invention. The disclosed container generally has a base 22, a vented lid 24, and a produce tray 26, each to be described below in greater detail. The disclosed container 20 can be included in a set of multiple containers creating a container system, as discussed below. The invention is not limited to only a single container 20 or to a specific number of the containers. Also, a container system can include multiple containers of the same size or can include containers of different storage capacity (i.e., three cup, five cup, and seven cup storage capacity, for example) but that have the same size bottom and top opening to utilize a common lid and tray size. In another example, such a system can be provided with some containers of the same size, some of different storage capacity but with common lids and trays, and/or some of different size and shape including different sized lids and trays.

The base 22, lid 24, and tray 26 of the container 20 are shown to be of a somewhat square-like (i.e., four-sided) or generally rectangular shape. However, other shapes and configurations of the base, tray, and lid, such as round or circular, are contemplated and are intended to fall within the scope of the invention. The invention is not to be limited to a specific container base, tray, and lid perimeter shape or overall contour. In general, the tray 26 is sized to fit within the base 22 as shown in FIG. 2, and the lid 24 is sized to fit over the base 22 during use.

Referring now to FIGS. 2 and 3, structural details of a representative base 22 are shown. The representative base 22 can be of a design exclusive to the disclosed produce storage container 20. Alternatively, the base 22 can be common to other food storage containers and systems, whereby the disclosed vented lid 24 and tray 26 are configured to mate with such a common platform base. The disclosed base 22 has a continuous circumferential side wall 30 and a bottom 32 that defines an interior storage space 34. In this example, the side wall 30 and the bottom 32 form a substantially four-sided shape, but with rounded corners, and a slight outward and upward taper to the side wall, as are known in the art. As noted above, other base shapes and configurations are contemplated and fall within the scope of the invention. The specific dimensions of the side wall 30 and the bottom 32 may vary and yet remain within the scope of the invention as well. The side wall 30 extends upwardly and generally outwardly from a perimeter of the bottom 32 and terminates at a top edge 36 that defines an open top 38. The open top 38 of the base 22 in this example can be identical in size and shape, regardless of interior volume, to other containers of a multiple container system so that all lids of the system can fit all of the bases.

The base 22 also has a foot or rib 40 that depends downward from the bottom 32 of the base. The foot 40 in this example is a continuous rib on the base bottom 32, but can alternatively be formed as a plurality of individual, discrete feet or ribs extending downward from the bottom. The disclosed foot extends circumferentially around the bottom 32 and is spaced inward from the side wall 30. The size, positioning, and shape of the foot can vary from the example shown and yet function as intended. The foot 40 provides a resting surface on which the container or base can rest during use and while being stored. The foot also has another purpose to be described below. A rim flange 42 extends radially outward from the side wall 30 below and spaced from the top edge 36 in this example. The rim flange can be provided to assist a user in carrying the container 20 during use and in gaining leverage to install and remove the lid 24 from the base 22.

The base 22 in the disclosed example can be formed of virtually any suitable material and using likewise suitable manufacturing processes. In one example, the base 22 can be injection molded from a polycarbonate material resulting in a substantially rigid and sturdy structure that is washable and highly durable. The base material can be clear, translucent, semi-transparent, or opaque as well.

With reference to FIGS. 1-8, the produce tray 26 in this example has a perforate panel 50 and a plurality of feet 52 depending downward from the bottom of the panel. The disclosed feet 52 in this example coincide with the generally four-sided configuration of the tray 26. Thus, the tray 26 has four depending feet in this example. As shown in FIG. 2, the feet 52 are of sufficient height so as to elevate the perforate panel 50 above the bottom 32 during use inside of the base 22. The feet 52 are positioned spaced apart around the circumference of the tray and closer to a perimeter edge of the tray to provide stability during use while supporting produce.

Figure 7:
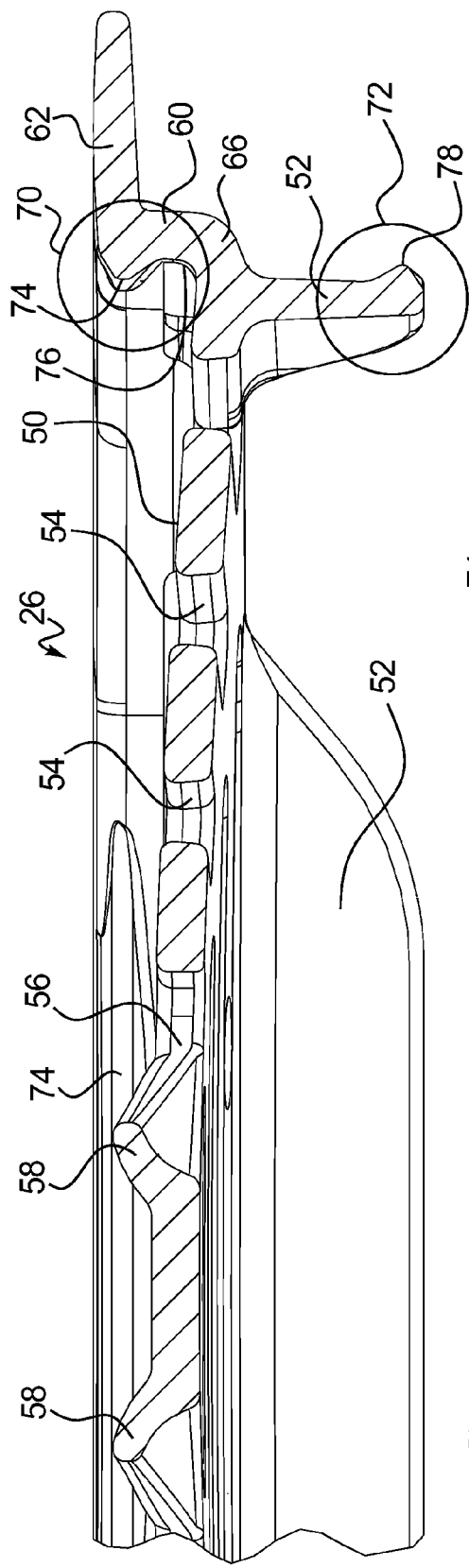
FIG. 7 shows a cross-section through a portion of the produce tray in FIG. 3 and taken along line VII-VII.

In general, the perforate panel 50 has a plurality of drainage holes 54 arranged spaced apart over and extending through the panel. In this example, four different arrays of drainage holes 54 are provided, one coinciding with each side of the four-sided tray. The drainage holes 54 in this example are in the form of generally elongate through-slots. However, the arrangement, location, shape, and contour of the drainage holes can vary widely from the example shown and yet function as intended. A pair of central holes 56 is positioned near the center of the tray 26 in this example. As best illustrated in FIGS. 1 and 7, a partial hood 58 projects upward and over a portion of each of the central holes 56, each in an opposite direction from the other. The hoods 58 create opposed finger grips to make it easy for a user to grasp, install, and remove the produce tray 26 from within the base 22. Thus, inclusion of the hoods or finger grips allows for the produce tray 26 to be sized to fit closely within the contour of the base side wall 30.

Figure 6:
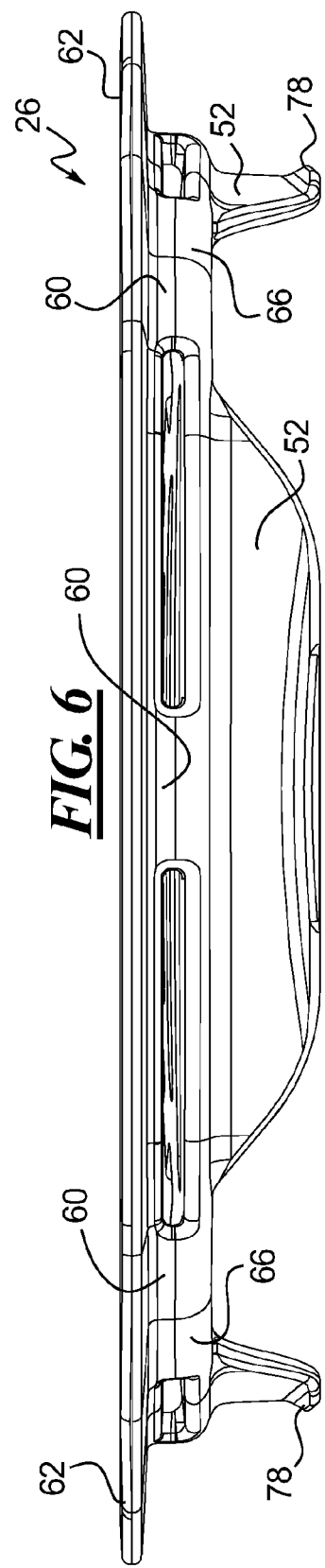
FIG. 6 shows a side view of the produce tray in FIG. 3.
Figure 8:
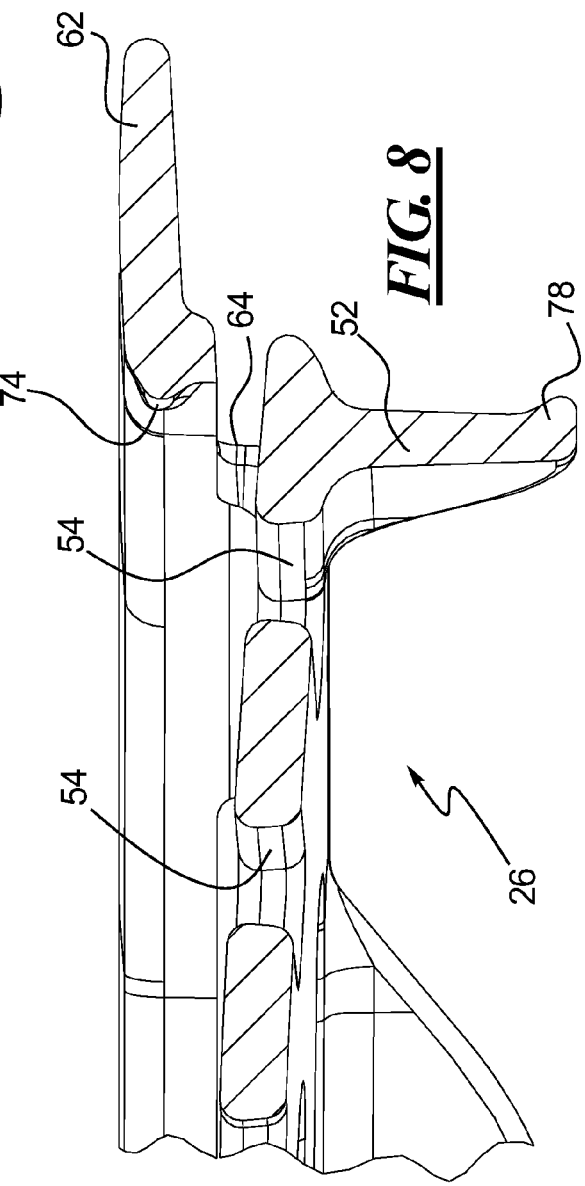
FIG. 8 shows a cross-section through a portion of the produce tray in FIG. 3 and taken along line VIII-VIII.

As best illustrated in FIGS. 2, 7, and 8, the perforate panel 50 is surrounded by an upstanding perimeter wall 60 extending up from a perimeter of the panel. A tray ledge or rim 62 extends radially outward and around the tray 26 from an upper end of the tray wall 60. With reference to FIGS. 6 and 8, a plurality of drainage openings 64 is provided through the tray wall 60. The openings 64 are spaced apart around the tray wall. In the disclosed example, the perforate panel 50 and the tray wall 60 are joined with one another at a curved transition or corner joint 66. The drainage openings extend down to a level of the perforate panel surface on the joint to allow drainage of any moisture that collects on the perforate panel adjacent the wall. The perforate panel 50 in the disclosed example is also not perfectly planar, but instead is slightly curved or crowned upward moving from the joint 66 around the panel to the central holes 56. A slight crown of the perforate panel 50 also encourages moisture collecting on the panel to flow or trickle toward the nearest drainage hole 54 or opening 64.

As with the base 22, the produce tray 26 can be formed of any suitable material and fabricated from any likewise suitable manufacturing process. In one example, the produce tray 26 can be injection molded from a polypropylene material, a polycarbonate material, or the like. In addition, the produce tray 26 can also be formed from a clear, translucent, semi-transparent, or opaque material and can be formed in any desirable color. In one example, the produce tray can be formed of a green material representative of the color of many produce items so as to make the produce tray easy for a consumer to locate.

As noted above, the container 20 disclosed and described herein is provided with a multi-component connecting structure for connecting the base 22, lid 24, and tray 26 with one another in a number of optional arrangements. In one aspect of the invention, the produce tray 26 disclosed herein is provided with two connecting components including a first tray component 70 and a second tray component 72. With reference to FIGS. 7-9, the first tray connecting component 70 is provided in the form of a plurality of elongate lips or projections 74 that extend radially inward from the tray wall 60. In the disclosed example, each of the four sides of the produce tray includes one of the projections 74 centrally located on its corresponding side of the tray wall. Each of the projections 74 creates an undercut or groove 76 directly beneath the corresponding projection. The combination of the projections 74 and undercuts 76 on the top of the tray 26 combine to define the first tray connecting component 70.

With reference to these same figures, each of the feet 52 has a bead or protrusion 78 on its lower end. The protrusions 78 project radially outward from the corresponding feet 52 on the produce tray 26. Each protrusion 78 is positioned to coincide with one set of the projections 74 and grooves 76 on the tray. The combination of the beads 78 and the respective feet 52 on the bottom of the tray 26 combine to define the second tray connecting component 72.

One function of the first and second tray connecting components 70 and 72 is to permit directly interconnecting two of the like trays 26 together as depicted in FIG. 9. In the disclosed example, the connecting components 70 and 72 create a snap connecting structure for snapping two of the trays together. The feet 52 on one of the trays 26 can be positioned directly over the projections 74 on another one of the trays 26. The top tray can then be pushed downward (or the lower tray up) onto the lower tray until the protrusions 78 snap over the corresponding projections 74 and seat within the undercuts or grooves 76 below the projections. In this manner, the trays 26 can be removably connected to one another for storage or stacked usage. The resilient nature of the tray material, along with the positional and dimensional relationship of the two connecting components 70 and 72 can create the interference necessary to provide the snap connection in this example.

As will be evident to those having ordinary skill in the art, the snap connection of the disclosed example can be replaced by other suitable connecting structures, mechanisms, and devices. In one example, a friction fit arrangement can be provided to connect two of the trays to one another. In such an example, a resilient, flexible thermoplastic elastomer material can be utilized to form at least one of the two connecting components 70 or 72, i.e., the projections 74 or the protrusions 78. The other of the two connecting components can be provided as a generally vertically oriented surface that is substantially flat in a vertical direction. Mechanical interference can be designed into the two connecting components so that the thermoplastic elastomer component is compressed against the flat surface of the other component when connected. Friction between the two mating components, as well as compressive force applied between the two interfering trays, can retain the two trays in the connected configuration of FIG. 9 without a positive detent or snap structure. Other tray-to-tray connecting structures and arrangements can be configured within the spirit and scope of the present invention. In one example, only one of the two connecting components may be optionally provided on the tray 26, whereby the trays could not be directly connected to one another, but instead could only be connected to a lid and/or a base.

With reference to FIGS. 1 and 10-14, the lid 24 in this example is formed with features that allow it to cover and seal the open top 38 of the base 22. As shown in FIGS. 1, 10, and 11, the lid 24 has a main panel 90 with a top side 92, a bottom side 94, and a perimeter skirt 96. The skirt 96 circumvents the perimeter of the main panel 90. As will be evident to those of ordinary skill in the art, the skirt 96 can vary in configuration and construction and yet fall within the spirit and scope of the present invention. In this example, the skirt 96 has a skirt wall 98 that extends around the main panel 90 and generally perpendicularly down from the plane of the main panel. In this example, the skirt wall is positioned inward from an outer edge 100 of the main panel. This creates a lid rim 102 projecting radially outward from the lid 24 beyond the skirt wall 98. A plurality of tabs 104 project down from underneath the main panel 90. The tabs 104 extend in a radial direction outward and merge with the skirt wall 98. The tabs create a standoff distance between a bottom edge 106 of each tab and the bottom side surface 94 of the main panel 90.

Though not shown herein, the lid 24 fits onto the base 22 so that the top edge 36 of the side wall 30 is received within the circumference of the skirt wall 98. In this in-use configuration, the lid 24 would cover and close off the open top 38 to seal the storage space 34. The top side 92 faces upward and the bottom side 94 faces downward into the storage space 34 of the container 20. In this example, the skirt wall 98 has a gradually thicker portion 108 that is shaped to form an annular seal ridge 110. The ridge 110 extends radially inward and circumferentially around the inner surface of the skirt wall 98. The top edge 36 of the base side wall 30 can have a bead (not shown) thereon, if desired, to further bear against an inner surface of the skirt wall with the lid installed on the base. An upper portion 112 of the side wall 30 is defined above the rim flange 42 and can be angled or tapered slightly radially outward. When the lid 24 is fit onto the base 22 to seal off the open top 38, the seal ridge 110 will bear interferingly against the outside surface of the upper side wall portion 112. The top edge 36 of the base 22 will seat against the bottom edges 106 of the tabs 104, spaced from the underside surface or bottom side 94 of the main panel 90. The lid may be drawn downward by the geometry of the upper portion 112 and the ridge 110 to assist in retaining the lid 24 installed on the base 22. The seal ridge 110 will create a seal between the lid 24 and the base 22 to close off the storage space, as is know in the art.

The shape and construction of the skirt 96 on the lid 24 and the upper portion 112 of the base side wall 30 can vary from the above-described example and yet remain within the scope of the invention. In addition, other lid-to-base seal configurations can be utilized on the storage container 20 disclosed herein and yet fall within the spirit and scope of the invention.

As shown in FIGS. 11-14, one or more sides of the four-sided lid 24 can include a vent opening 114 through the skirt wall 98. In the disclosed example, two of the opposed sides include such an opening 114. Each vent opening 114 is positioned high on the wall so that, when the lid 24 is installed on the base 22, the top edge 36 of the base side wall 30 will be below the vent openings. This is ensured by the position of the tab bottom edges 106. Thus, even with the lid 24 installed on the base 20, the vent openings 114 are clear and uncovered to permit air flow between the storage space 34 and the environment outside of the container 20. In this example, the vent openings 114 are tucked closely up and under the lid rim flange 42. Thus, the vent openings are substantially protected against spilled liquid or food items from inadvertently entering the container 20 through the vent openings.

The number, size, spacing, shape, and the like of the vent openings 114 can vary considerably from the examples shown here in. It is known that produce freshness may be hindered if the vent openings are too large, too many, too small, or too few. Thus, it is within the purview of the present invention to provide adjustable size vents, a selectable number of vents, or a plurality of optionally selectable lids with different types of vent openings.

As shown in FIGS. 1, 10-12, and 14, the lid 24 also has a first lid connecting component 120 and a second lid connecting component 122 of the multi-component connecting structure for the container 20. As with the tray 26, the first lid component 120 and second lid component 122 can be formed in a number of alternative ways that differ from the structures shown. In one example, these components form a snap connection, similar to the above-described produce tray 26. In the disclosed example, the first lid connecting component 120 is provided on the top side 92 on the main panel 90 of the lid 24. The second lid connecting component 122 is provided on the bottom side 94 of the main panel 90.

As shown in FIGS. 1 and 14, the main panel 90 has a central recessed or sunken section 124 surrounded by a vertical upstanding lid wall 126 that faces the recessed section. In the disclosed example, the lid wall 126 has four side segments that correspond to the four-sided shape of the lid 24. Each of the four segments of the lid wall has a lip or projection 128 extending radially inward toward the opposite lid wall segment. Similar to the tray connecting components described above, an undercut or groove 130 is formed beneath each of the lips 128 on the top side of the lid. The combination of the lips 128 and grooves 130 on the top side 92 of the lid define the first lid connecting component 120.

Four flanges 132 project down from the bottom side 94 of the lid 24 in this example. Similar to the tray feet 52 described above, each flange 132 has a bead or catch 134 that projects radially outward from a bottom edge of the corresponding flange. The second lid connecting component 122 is formed by a combination of the flanges 132 and the respective beads or catches 134.

With reference to FIGS. 2 and 15, the base 22 has a base connecting component 140 as another of the components of the multi-components connecting structure for the container 20 disclosed and described herein. In this example, the foot or rib 40 is angled in a radially outward direction moving away from the bottom 32 of the base 22. Each side segment of the four-sided, continuous rib or foot also has a rib protrusion 142 that projects radially outward from the foot or rib 40. An inset or shallow channel 144 is formed above each of the protrusions 142 below the bottom 32 of the base 22 and on an exterior of the foot 40. The combination of the inset channels 144 and rib protrusions 142 form the base connecting component 140 in this example.

As with the base 22 and produce tray 26, the lid can also be formed of any suitable material and fabricated from any likewise suitable manufacturing process. In one example, the lid 24 can be injection molded from a polypropylene material, a polyethylene material, or the like. In addition, the lid 24 can also be formed from a clear, translucent, semi-transparent, or opaque material and can be formed in any desirable color. In one example, the lid can also be formed of a green material representative of the color of many produce items so as to make the lid easy to find and easy for a consumer to find and to match up with the produce tray 26.

One function of the first lid connecting component 120 is to permit directly interconnecting the lid 24 to the bottom 32 of the base 22 as depicted in FIG. 15. In the disclosed example, the first lid connecting component 120 and the base component 140 also create a snap connecting structure for snapping the lid to the base bottom. The foot or rib 40 on the base 22 can be positioned directly over the recessed section 124 on the top side 92 of the lid 24. The base can then be pushed downward (or the lid upward) onto the lid until the rib protrusions 142 snap over the corresponding lid wall lips 128 and the lips seat within the inset channels 144 below the base bottom 32 and above the rib protrusions 142. In this manner, the lid 24 and base 22 can be removably connected to one another for storage. The resilient nature of the lid material, and perhaps the rib 40 and protrusions 142, along with the positional and dimensional relationship of the two connecting components 120 and 140, can create the interference necessary to provide the snap connection in this example.

Another function of the first tray connecting component 70 in this example is to permit directly interconnecting the tray 26 to the base bottom 32, as depicted in FIG. 16. In the disclosed example, the connecting component 70 and 140 also create a snap connecting structure for snapping the tray to the base. The foot or rib 40 on the base 22 can be positioned directly over the projections 74 on the tray 26. The base can then be pushed downward (or the tray up) onto the base until the protrusions 142 snap over the corresponding projections 74. The base protrusions 142 will seat within the undercuts or grooves 76 below the projections on the tray and, likewise, the tray projections 74 will seat in the inset channels 144 on the base. In this manner, the base and tray can be removably connected to one another for storage. The resilient nature of the tray material, and perhaps the rib 40 and protrusions 142, along with the positional and dimensional relationship of the two connecting components 70 and 140 can create the interference necessary to provide the snap connection in this example.

Figure 17:
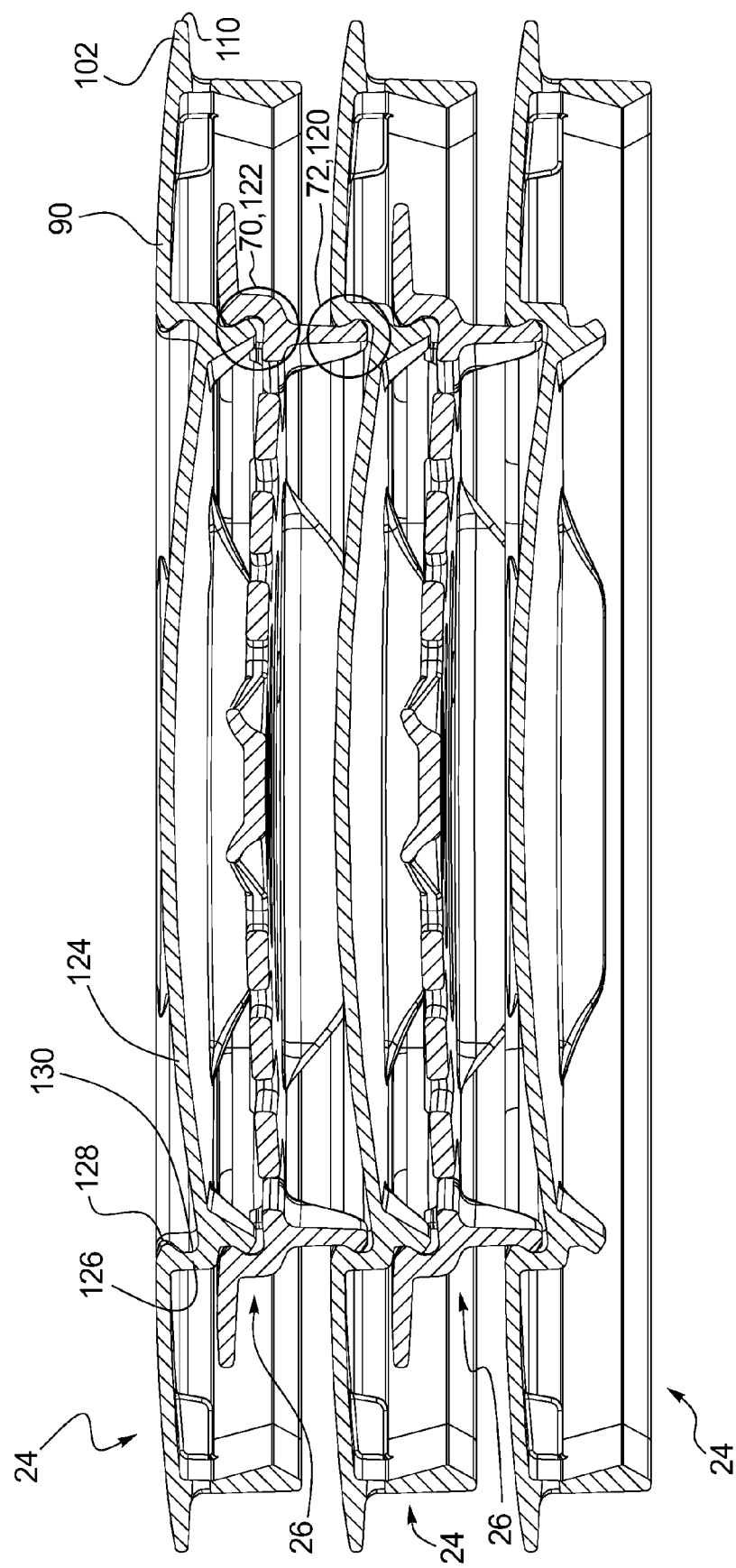
FIG. 17 shows a plurality of the previously illustrated lids and trays intermittently stacked and connected to one another.

In the disclosed example, one function of the second lid connecting component 122 and another function of the first and second tray connecting components 70 and 72 and the first lid connecting component 120 are to permit directly interconnecting the tray 26 to the lid 24 on either side of the lid. With reference to FIGS. 15 and 17, the tray 26 can be connected to the bottom side 94 of the lid 24. In essentially the same manner as previously described, the first connecting component 70 on the tray 26 can be connected to the second connecting component 122 on the lid 24. In other words, the tray 26 can be snapped onto the flanges 132 of the lid 24 so that the catches 134 snap past the projections 74 and a seat in the grooves 76. With reference to FIGS. 16 and 17, the tray 26 can also be connected to the top side 92 of the lid 24. In essentially the same manner as previously described, the second connecting component 72 of the tray can be connected to the first connecting component 120 on the lid. In other words, the tray feet 52 can be snapped onto the lips 128 on top of the lid with the protrusions 78 seated in the grooves 130.

In the disclosed example, two like lids 24 can not be connected directly to one another. The flanges 132 are disclosed is not being long enough to connect with the first connecting components 120 on a like lid. As will be evident to those having ordinary skill in the art, the lids can be constructed to optionally connect directly with one another in accordance with the teachings of the present invention. With reference to FIG. 17, a plurality of lids 24 and trays 26 can be connected to one another in alternating fashion for storage and organization purposes.

In the disclosed example, the various lid, tray, and base connecting components are configured to perform multiple connecting functions. However, each of these container parts can alternatively be configured to include additional connecting components so that each connecting component on each part performs only one connecting function, such as only a lid-to-base connecting function, a tray-to-lid bottom connecting function, a tray-to-lid top connecting function, or a tray-to-base connecting function. The connecting component functions on the lids and trays can also be reversed or inverted from disclosed arrangement. In other words, the bottom side 94 of a lid, instead of the top side, can be configured to connect to the base bottom or to the feet of a tray. Likewise, the tray feet can be configured to connect to the base bottom or to the bottom side of the lid, instead of the top side.

In another example, individual bases 22 without lids or trays can be nested to form a nested base stack for storage. If desired, the stack of trays and lids in FIG. 17 can then be connected to the lowermost base bottom for organized storage of a set of the containers 20.

If a container system with multiple containers 20 is provided, the disclosed connecting structure arrangement provides another advantage. With the trays in the bases and produce inside the containers, one container can be connected to the top of the lid of another container for stable and easy transport of the filled containers. The containers will not slide off of one another or tip, making it easy to transport a stack of the filled containers 20. Another advantage of the disclosed container 20 is that the perforated produce tray will elevate produce above the bottom of the base 22. Any moisture collecting in the container, such as by condensation, will sit at a bottom of the base. The produce will not sit in the moisture, which will help to keep produce fresher longer as well.

As noted above with respect to the trays 26, the snap connection for the lids and bases can also be replaced by other suitable connecting structures, mechanisms, and devices. In one example, a friction fit arrangement can be provided to connect the tray to the base or to the lid. Likewise, a friction fit connection can be provided to connect the lid to the base or to the tray. Other tray-to-base, lid-to-base, and lid-to-tray connecting structures and arrangements can be configured within the spirit and scope of the present invention.

Although certain storage containers and systems have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A food storage container comprising:
 a base having a bottom, a continuous side wall extending up from the bottom and terminating at an upper end, a storage space within the side wall above the bottom, and an open top bounded by the upper end;
 a lid having a main panel section and a perimeter skirt around the main panel section, the lid configured to close off the open top near the upper end of the side wall;
 a tray having a perforate panel and a tray foot depending downward from a bottom of the tray, the tray sized to fit within the storage space with the tray foot resting on the bottom of the base and the perforate panel elevated above the bottom of the base; and
 a connecting structure having a first lid component carried on the lid, a base component carried on the base, and a first tray component carried on the tray, the connecting structure configured so that the lid and the tray are connectable to one another, and the lid and the tray are separately connectable to the bottom under the base,
 wherein the base component is formed by part of a base foot that projects downward from the bottom under the base, and wherein the tray and the lid can each be selectively snapped onto the base foot,
 wherein the connecting structure further comprises a second lid component on an underside of the main panel section of the lid, and a second tray component formed by a part of the perforate panel of the tray, the first lid component being on a top side of the main panel section, and the first tray component being formed by a part of the tray foot, wherein the first lid component can be selectively snapped onto the base foot to connect the lid to the bottom of the base, and the perforate panel can be snapped onto the second lid component to connect the tray to the lid, and wherein the perforate panel can be selectively snapped onto the base foot to connect the tray to the bottom of the base, and the first lid part can be snapped onto the tray foot to connect the lid to the tray, and
 wherein, when the tray is disposed within the base, the storage space is defined by the perforated panel of the tray and the side wall of the base.

2. A food storage container according to claim 1, wherein the lid includes at least one vent hole that is open when the lid is installed to close off the open top.

3. A food storage container according to claim 2, wherein the at least one vent hole is formed through a skirt wall of the perimeter skirt and is positioned above the upper end of the side wall when the lid is installed to close off the open top.

4. A food storage container according to claim 1, wherein the first lid component can be directly connected to the base component under the bottom with the tray directly connected to the lid.

5. A food storage container according to claim 4, wherein a second tray component of the connecting structure can be directly connected to a second lid component of the connecting structure with the lid directly connected to the base.

6. A food storage container according to claim 1, wherein the first tray component can be directly connected to the base under the bottom with the lid directly connected to the tray.

7. A food storage container according to claim 1, wherein a second lid component of the connecting structure can be directly connected to a second tray component of the connecting structure with the tray directly connected to the base.

8. A food storage container according to claim 1, wherein the tray can be selectively connected to either one of a top side of the lid and to a bottom side of the lid.

9. A food storage container according to claim 6, wherein the tray foot connects the tray to the top side of the lid and a portion of the perforate panel connects the tray to the bottom side of the lid.

10. A food storage container according to claim 1, wherein the connecting structure incorporates a snap fit connection between the lid, the tray, and the base when connected to one another.

11. A food storage container system comprising:
 a plurality of bases each having a bottom, a continuous side wall extending up from the bottom and terminating at an upper end, a storage space within the side wall above the bottom, and an open top bounded by the upper end;
 a plurality of lids each having a main panel section and a perimeter skirt around the main panel section, each lid configured to connect with the side wall and close off the open top of a respective base of the plurality of bases;

a plurality of trays each having a perforate panel and a tray foot depending downward from a bottom of the tray, each tray of the plurality of trays sized to fit within the storage space of a corresponding base of the plurality of bases with the tray foot resting on the bottom of the corresponding base and the perforate panel elevated above the bottom, wherein, when one tray of the plurality of trays is disposed within the corresponding base, the storage space is defined by the perforated panel and the side wall of the corresponding base; and a plurality of connecting structures including a base component on the bottom under each base of the plurality of bases, first and second lid components on each lid of the plurality of lids, and first and second tray components on each tray of the plurality of trays, wherein for each connecting structure of the plurality of connecting structures, the base component is formed by part of a base foot that projects downward from the bottom under the base, and wherein the tray and the lid can each be selectively snapped onto the base foot, wherein for each connecting structure of the plurality of connecting structures, the second lid component is on an underside of the main panel section of the lid, the second tray component is formed by a part of the perforate panel of the tray, the first lid component is on a top side of the main panel section, and the first tray component is formed by a part of the tray foot, wherein the first lid component can be selectively snapped onto the base foot to connect the lid to the bottom of the base, and the perforate panel can be snapped onto the second lid component to connect the tray to the lid, and wherein the perforate panel can be selectively snapped onto the base foot to connect the tray to the bottom of the base, and the first lid part can be snapped onto the tray foot to connect the lid to the tray, and wherein each connecting structure of the plurality of connecting structures is configured so that the plurality of lids and the plurality of trays are connectable to one another, and each lid of the plurality of lids and each tray of the plurality of trays are separately connectable to the bottom under one base of the plurality of bases.

12. A food storage container system according to claim 11, wherein each lid of the plurality of lids includes at least one vent hole that is open when the lid is installed to close off the open top.

13. A food storage container system according to claim 11, wherein each tray of the plurality of trays is selectively connectable to either one of a top side and a bottom side of each lid of the plurality of lids.

14. A food storage container according to claim 11, wherein the plurality of connecting structures incorporates a snap fit connection between the pluralities of lids, trays, and bases when connected to one another.

15. A food storage container system comprising:

a plurality of bases each having a bottom, a continuous side wall extending up from the bottom and terminating at an upper end, a storage space within the side wall above the bottom, and an open top bounded by the upper end;

a plurality of lids each having a main panel section and a perimeter skirt around the main panel section, each lid configured to connect with the side wall and close off the open top of a respective base of the plurality of bases;

a plurality of trays each having a perforate panel, a tray foot, a shallow tray wall around the perforated panel, and a ledge extending radially outward from an upper end of each shallow tray wall, each tray of the plurality of trays sized to fit within the storage space of one base of the plurality of bases with the tray foot resting on the bottom of the one base and the perforate panel elevated above the bottom; and a plurality of connecting structures each having a first lid component carried on a respective lid of the plurality of lids, a base component carried on a respective base of the plurality of bases, and a first tray component carried on a respective tray of the plurality of trays, the connecting structure configured so that the respective lid and the respective tray are connectable to one another, and the respective lid and the respective tray are separately connectable to the bottom under the respective base, wherein the base component is formed by part of a base foot that projects downward from the bottom under the respective base, and wherein the respective tray and the respective lid can each be selectively snapped onto the base foot, wherein each connecting structure of the plurality of connecting structures further comprises a second lid component on an underside of the main panel section of the respective lid, and a second tray component formed by a part of the perforate panel of the respective tray, the first lid component being on a top side of the main panel section, and the first tray component being formed by a part of the tray foot, wherein the first lid component can be selectively snapped onto the base foot to connect the respective lid to the bottom of the respective base, and the perforate panel can be snapped onto the second lid component to connect the respective tray to the respective lid, and wherein the perforate panel can be selectively snapped onto the base foot to connect the respective tray to the bottom of the respective base, and the first lid part can be snapped onto the tray foot to connect the respective lid to the respective tray wherein, when one tray of the plurality of trays is disposed within a respective base of the plurality of bases, the storage space is defined by the perforated panel and the side wall of the respective base, and wherein the plurality of lids and the plurality of trays are connectable to one another in a lid and tray stack, and a lid of the lid and tray stack and a tray of the lid and tray stack are separately connectable to the bottom under any one base of the plurality of bases.

16. A food storage container system according to claim 15, wherein each base of the plurality of bases is sized to nest at least partially within the interior storage space of the other bases of the plurality of bases.

* * * * *